Figure 1:
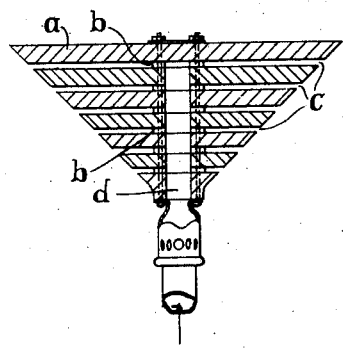

G. DETSINYI.
GAS BURNER FOR LIGHTING AND HEATING PURPOSES.
APPLICATION FILED JAN. 21, 1908.

901,596.
Patented Oct. 20, 1908.

WITNESSES:

INVENTOR:
GUSTAV DETSINYI,
ATTORNEYS

UNITED STATES PATENT OFFICE.

GUSTAV DETSINYI, OF BERLIN, GERMANY.

GAS-BURNER FOR LIGHTING AND HEATING PURPOSES.

No. 901,596.  Specification of Letters Patent.  Patented Oct. 20, 1908.

Application filed January 21, 1908. Serial No. 411,907.

*To all whom it may concern:*

Be it known that I, GUSTAV DETSINYI, a subject of the King of Hungary, residing at Berlin, Germany, have invented certain new and useful Improvements in Gas-Burners for Lighting and Heating Purposes, of which the following is a specification.

This invention relates to a means for distributing the gas in gas burners for heating purposes.

An important factor in incandescent gas heating is the extent of the incandescent surface. The emission of light, with other conditions equal, is proportional to the extent of such surface. In the usual incandescent gas-heating process only a small part of the heat of the flame is used. Much more can be used if the flame is enlarged, and a considerably larger incandescent body is caused to become incandescent. According to the present invention, this result is obtained by the mode of distributing the gases of combustion which utilizes the new burner shown in the drawings, which show two forms, in section, of the burner body according to this invention.

Figure 2:
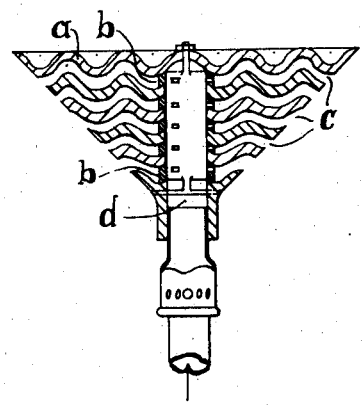

In Figure 1, the burner has flat plates, and in Fig. 2 the plates are corrugated.

The gases are led between narrow slits $c$ between plates $a$, arranged closely above one another, to the outer surfaces of the plates, where they are ignited. On the slits formed between each pair of plates, flame rings are formed, to make up a flame mantle.

The supply of the gas can be effected through a suitable passage $d$ at the center of the plates, and formed of a number of refractory blocks, $b$, formed with openings, for the passage of gas, and alternating with the plates $c$, or otherwise made up.

The whole of the plates are preferably of the form of an inverted cone as shown at Fig. 1.

It is of advantage to make the plates of badly-conducting material so that the heat given out by the flame to the same will not be withdrawn and leave insufficient heat for causing the incandescent body to glow. It is also particularly advantageous that the outer surfaces of the plate form an inverted conical surface, so that the most powerful rays of heat given off perpendicularly from the conical surface will be directed downwards.

The described burner, especially when the outer surfaces are of downwardly-directed conical form, is especially suitable for heating rooms, because, in this case, the flame rings are directed against the projecting cone surfaces extending at an angle above and lick and heat these intensely, and the heat rays are thrown off in a downward direction by these surfaces, to points where the heat is desired. By this means, the unnecessary heating of the upper part of the room is prevented.

What I claim is:—

In an incandescent gas burner, the combination, with a supply tube, of a plurality of superposed plates surrounding said tube, there being a narrow slit or passage between each pair of plates communicating with the tube and extending to the peripheries of the plates, the lower plates being of lesser diameter than those above them and the whole formed to direct the rays of heat downwardly.

In testimony whereof I have signed my name to this specification in the presence of two subscribing witnesses.

GUSTAV DETSINYI.

Witnesses:
WOLDEMAR HAUPT,
HENRY HASPER.